United States Patent
Humpert et al.

(10) Patent No.: US 7,124,122 B1
(45) Date of Patent: Oct. 17, 2006

(54) METHOD OF DRAFTING CONTROL AND INSTRUMENTATION TECHNOLOGY

(75) Inventors: Hans-Dieter Humpert, Hemhofen (DE); Peter Kapinus, Weisendorf (DE); Heinrich Kleinen, Erlangen (DE); Dieter Kleyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 663 days.

(21) Appl. No.: 10/110,732

(22) PCT Filed: Sep. 22, 2000

(86) PCT No.: PCT/DE00/03319

§ 371 (c)(1),
(2), (4) Date: Apr. 15, 2002

(87) PCT Pub. No.: WO01/29625

PCT Pub. Date: Apr. 26, 2001

(30) Foreign Application Priority Data

Oct. 15, 1999 (DE) ................................. 199 49 884

(51) Int. Cl.
*G06F 17/00* (2006.01)
*G06N 5/02* (2006.01)

(52) U.S. Cl. ............................. 706/46; 706/14; 706/12

(58) Field of Classification Search ................. 706/46, 706/14, 12; 700/17
See application file for complete search history.

(56) References Cited

U.S. PATENT DOCUMENTS

| | | | | |
|---|---|---|---|---|
| 5,706,455 A | * | 1/1998 | Benton et al. .............. | 715/853 |
| 5,812,394 A | * | 9/1998 | Lewis et al. ................. | 700/17 |
| 5,950,006 A | * | 9/1999 | Crater et al. ................ | 717/140 |
| 6,054,986 A | * | 4/2000 | Kato ........................... | 715/763 |
| 6,093,215 A | * | 7/2000 | Buxton et al. .............. | 717/107 |

FOREIGN PATENT DOCUMENTS

| | | |
|---|---|---|
| DE | 195 13 230 A1 | 10/1996 |
| DE | 195 39 479 A1 | 4/1997 |
| DE | 195 39 480 A1 | 4/1997 |
| EP | 0 707 248 A1 | 4/1996 |
| EP | 0 829 801 A2 | 3/1998 |
| EP | 1 061 423 A1 | 12/2002 |
| WO | WO 99/23541 | 5/1999 |

* cited by examiner

*Primary Examiner*—Joseph P. Hirl
(74) *Attorney, Agent, or Firm*—Harness, Dickey & Pierce, P.L.C.

(57) ABSTRACT

A method of drafting a program code of control and instrumentation technology for operating a plant is disclosed using industrial components. The program code, in its graphical representation, comprises a plurality of sub-plans. The program code of the control and instrumentation technology and the industrial components are represented together in a machine-readable technology plan. The sub-plans, especially the functional plans of the individual plane, are automatically generated from the technology plan, and the individual sequences of the program code are generated from the functional plans. The method makes manual drafting or manual correction project planning superfluous.

29 Claims, 7 Drawing Sheets

METHOD OF DRAFTING CONTROL AND INSTRUMENTATION TECHNOLOGY

This application is the national phase under 35 U.S.C. § 371 of PCT International Application No. PCT/DE00/03319 which has an International filing date of Sep. 22, 2000, which designated the United States of America, the entire contents of which are hereby incorporated by reference.

FIELD OF THE INVENTION

The present invention generally relates to a method for producing a program code for instrumentation and control for operating an installation with process-engineering components. Preferably, the program code includes a multiplicity of individual sequences.

BACKGROUND OF THE INVENTION

Process-engineering components such as pumps, valves, containers and measured-value pickups have to date been shown in a first diagram, and the program code for instrumentation and control has been shown in a second diagram. To improve clarity, these two diagrams have been combined in a general diagram produced manually. The reason for this is that such a general diagram is the only basis on which it is possible for the process-engineering operatives and the control operatives to cooperate.

In the graphical representation, the program code for instrumentation and control comprises a multiplicity of sub-diagrams, particularly function diagrams for the individual level. These sub-diagrams are used for implementing the required process-engineering functions, such as regulation, partial or group control, step control and measurement and also measured-value correction and the like. The individual sub-diagrams have corresponding software modules which are connected to one another. The sub-diagrams themselves are also linked to one another, for example by defined break points. The sub-diagrams are graphical representations of the individual sequences of the program code.

The known general diagram is an exclusively graphical representation. Consistency and freedom from error have to be ensured manually. Changes in the program code for instrumentation and control or in the process-engineering components likewise have to be made manually. The management of change is therefore complex and prone to error. Continual matching of the program code or of the process-engineering components to changes in the general diagram, or vice versa, is virtually impossible.

SUMMARY OF THE INVENTION

It is therefore an object of an embodiment of the present invention to provide a method with which the production and maintenance of the individual diagrams, particularly the configuration of change, are considerably simplified and/or sources of error are minimized or precluded.

An embodiment of the invention which may achieve this object can include a method wherein information about the program code for instrumentation and control, the process-engineering components and their links is shown together in at least one machine-readable technology diagram. Preferably, at least one technology diagram is used for automatically generating subdiagrams, particularly function diagrams for the individual level, which are a graphical representation of the individual sequences. Also, the individual sequences of the program code can be automatically generated from the sub-diagrams.

Once the technology diagram has been produced, the sub-diagrams and the individual sequences of the program code are produced automatically. Thus, manual implementation is no longer necessary. The errors which have arisen previously during implementation can thus be avoided. The sub-diagrams can readily be tracked to changes in the technology diagram. Thus, the configuration of change is simplified considerably. In addition, the relevant, current information is always available in the technology diagram and is displayed there. The cooperation between the process-engineering operatives and the control operatives is significantly simplified.

Advantageously, the technology diagram is divided into a series of sections. These sections structure the technology diagram and make it easier to find particular positions. The structuring is particularly useful in the case of large technology diagrams and improves clarity.

In one advantageous refinement, precisely one sub-diagram is generated from precisely one section. The bounds of the sub-diagrams can thus be stipulated in the technology diagram, and the scope of each sub-diagram is defined precisely. It is also possible to see which sub-diagrams exchange information with one another, so that signal configuration is simplified.

In accordance with one advantageous development, each section comprises a series of symbols, and each of these symbols is assigned to precisely one module of the associated sub-diagram. The number of modules in the sub-diagram thus corresponds to the number of symbols in the section of the technology diagram. In addition, standardized symbols for the technology diagram can be provided for the standardized modules of the sub-diagrams.

Advantageously, precisely one individual sequence of the program code is generated from each sub-diagram. The individual sequences can therefore be checked quickly. In addition, the number of individual sequences generated needs to correspond to the number of sub-diagrams, and hence to the number of sections in the technology diagram, so that a simple plausibility check can be carried out.

In accordance with one advantageous refinement, to improve clarity, a plurality of symbols and/or a plurality of sections of the technology diagram are combined and put together to form a diagram symbol. This is called "diagram in the diagram". The diagram symbol is split into the fundamental symbols and/or sections by means of a suitable action. These symbols and/or sections can then be checked directly in the technology diagram and can be altered if appropriate. Naturally, a plurality of levels of diagram symbols are possible. The diagram symbols improve clarity, since, by way of example, sections of the technology diagram which have already been processed can be put together in a characteristic diagram symbol. This significantly simplifies the graphical representation of the technology diagram, and information which is not required at the present time is not shown.

Advantageously, symbols contained in the technology diagram are provided with an identification. This identification is unique either across the installation or in relation to the technology diagram. It allows the symbols to be clearly assigned to the modules of the sub-diagrams.

In one advantageous refinement, the technology diagram is subjected to a plausibility check. Errors arising during configuration are identified and can be immediately eliminated.

In accordance with one advantageous development, a consistency check is carried out between the individual sub-diagrams and between the sub-diagrams and the technology diagram. The consistency check involves the identification of errors or gaps in the configuration, and a corresponding report is output.

Advantageously, the technology diagram is provided with at least one interface for connecting it to other engineering systems. This allows information to be imported into the technology diagram from other engineering systems. It is naturally also possible for information to be exported from the technology diagram to other engineering systems. Information which is already available can thus be imported into the technology diagram quickly, effortlessly and without transmission errors. In addition, individual parts of the technology diagram can be exported to other engineering systems for processing and, following processing, can be imported into the technology diagram again. Furthermore, it is possible for information to be exchanged between incompatible engineering systems using the technology diagram.

In accordance with one advantageous refinement, information contained in the technology diagram is shown graphically. To show this information, graphical symbols are advantageously imported into the technology diagram. It is thus possible to use meaningful, self-explanatory symbols. These symbols can be selected or produced and imported into the technology diagram by the operatives themselves. This significantly improves clarity.

In one advantageous development, only some of the information contained in the technology diagram is shown graphically. Overloading of the technology diagram with information which severely reduces the clarity is reliably avoided. A suitable action from a user calls and displays this information which is not shown graphically. This information can then be checked and, if appropriate, altered and stored. When editing is complete, the display is closed again, so that the clarity of the technology diagram is restored.

Advantageously, only some of the information required for fully generating the sub-diagrams and individual sequences is included in the technology diagram. The sub-diagrams contain detailed information, such as monitoring times, threshold values and similar variables which are in many cases not yet definite at the time at which the technology diagram is produced. This information has no further relevance to the technology diagram, since it relates only to details of the instrumentation and control and does not affect the basic structure of the instrumentation and control. This information can frequently be input only when the basic structure of the program code for instrumentation and control has been stipulated. According to an embodiment of the invention, the technology diagram is therefore produced without this information, and this information is added subsequently. It can be added either in the technology diagram or directly in the individual sub-diagrams or individual sequences.

In accordance with one advantageous development, generation of the sub-diagrams involves the identification and display of gaps in the information contained in the technology diagram. This ensures that the sub-diagrams are generated and configured completely.

BRIEF DESCRIPTION OF THE DRAWINGS

The invention is explained in more detail below using exemplary embodiments which are shown schematically in the drawings. The same reference symbols are used for elements which are the same or have identical functions in the drawings, in which.

DETAILED DESCRIPTION OF THE PREFERRED EMBODIMENTS

Figure 1:
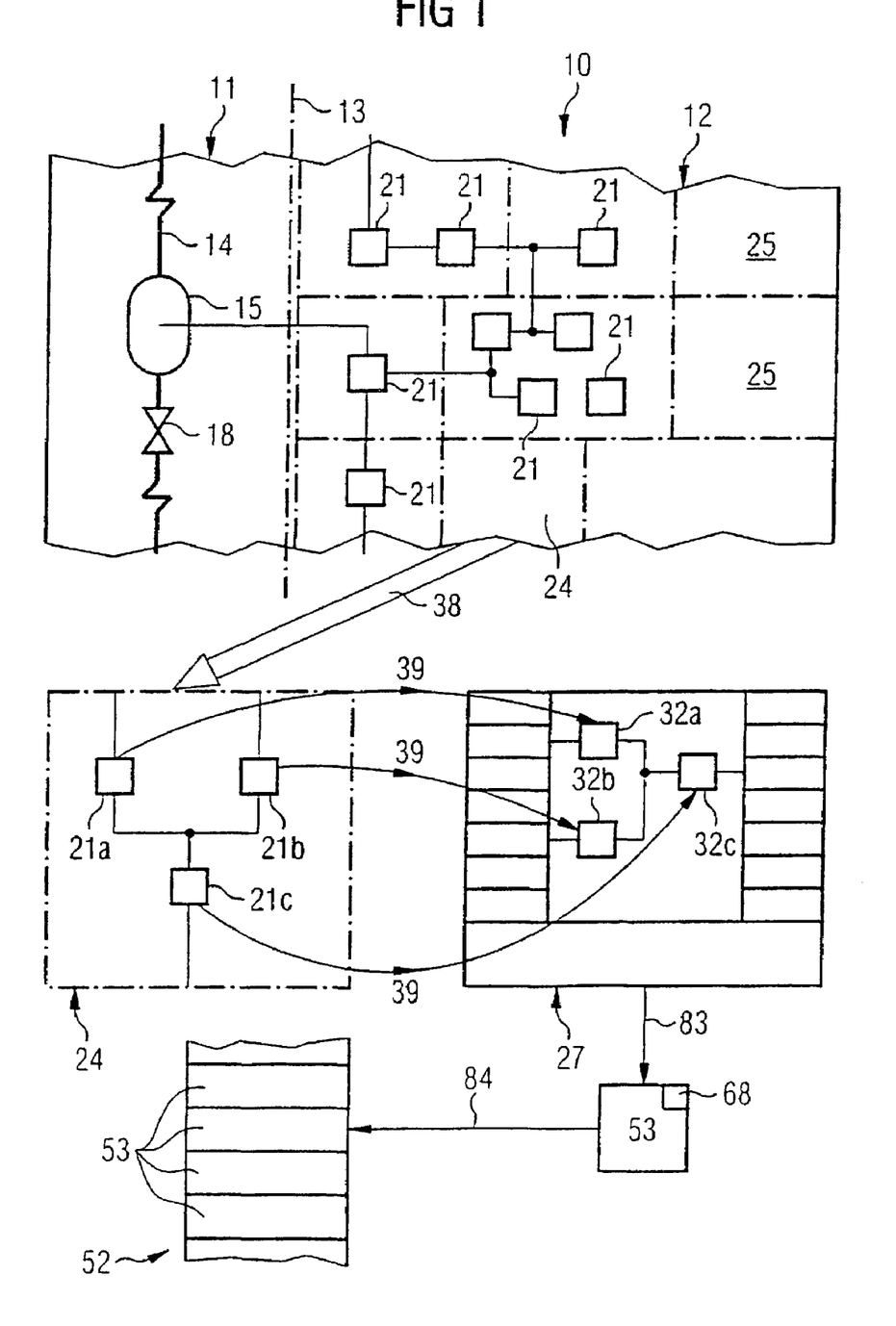
FIG. 1 shows a schematic illustration of the inventive method in a first embodiment.

FIG. 1 shows a schematic illustration of the inventive method. A technology diagram 10 is provided which contains both a diagram 11 of the process engineering and a diagram 12 of a program code 52 for instrumentation and control. The separation between the two diagrams 11, 12 is indicated schematically by the dashed line 13.

The diagram 11 of the process engineering contains a series of process-engineering components. FIG. 1 schematically shows a pipe 14, a container 15 and a valve 18. These components 14, 15, 18 form an installation.

The diagram 12 of the program code 52 is divided into a series of sections 24, 25. The division is indicated by means of dash-dot lines. These sections 24, 25 each comprise one or more symbols 21 which are linked to one another. The symbols 21 and their links schematically represent the program code 52 for instrumentation and control which is required for operating the installation.

According to an embodiment of the invention, the technology diagram 10 is machine-readable. From a respective section 24, 25, a function diagram 27 is produced. This is shown schematically with reference to the section 24.

The section 24 is first identified as a separate section of the technology diagram 10, as shown by arrow 38. Next, each symbol 21a, 21b, 21c of the section 24 is assigned precisely one module 32a, 32b, 32c of the associated function diagram 27. This is indicated schematically by the arrows 39. The links between the individual symbols 21a, 21b, 21c are likewise transferred to the function diagram 27. The function diagram 27 can thus be automatically generated from the technology diagram 10.

From the function diagram 27, an individual sequence 53 of the program code 52 is then generated, as shown by arrow 83. The modules 32 of the function diagram 27, their links and break points are automatically converted into the corresponding instructions of the individual sequence 53. From each function diagram 57, precisely one individual sequence 53 is generated. The individual sequences 53 generated are put together in the program code 52 as shown schematically by arrow 84.

Figure 2:
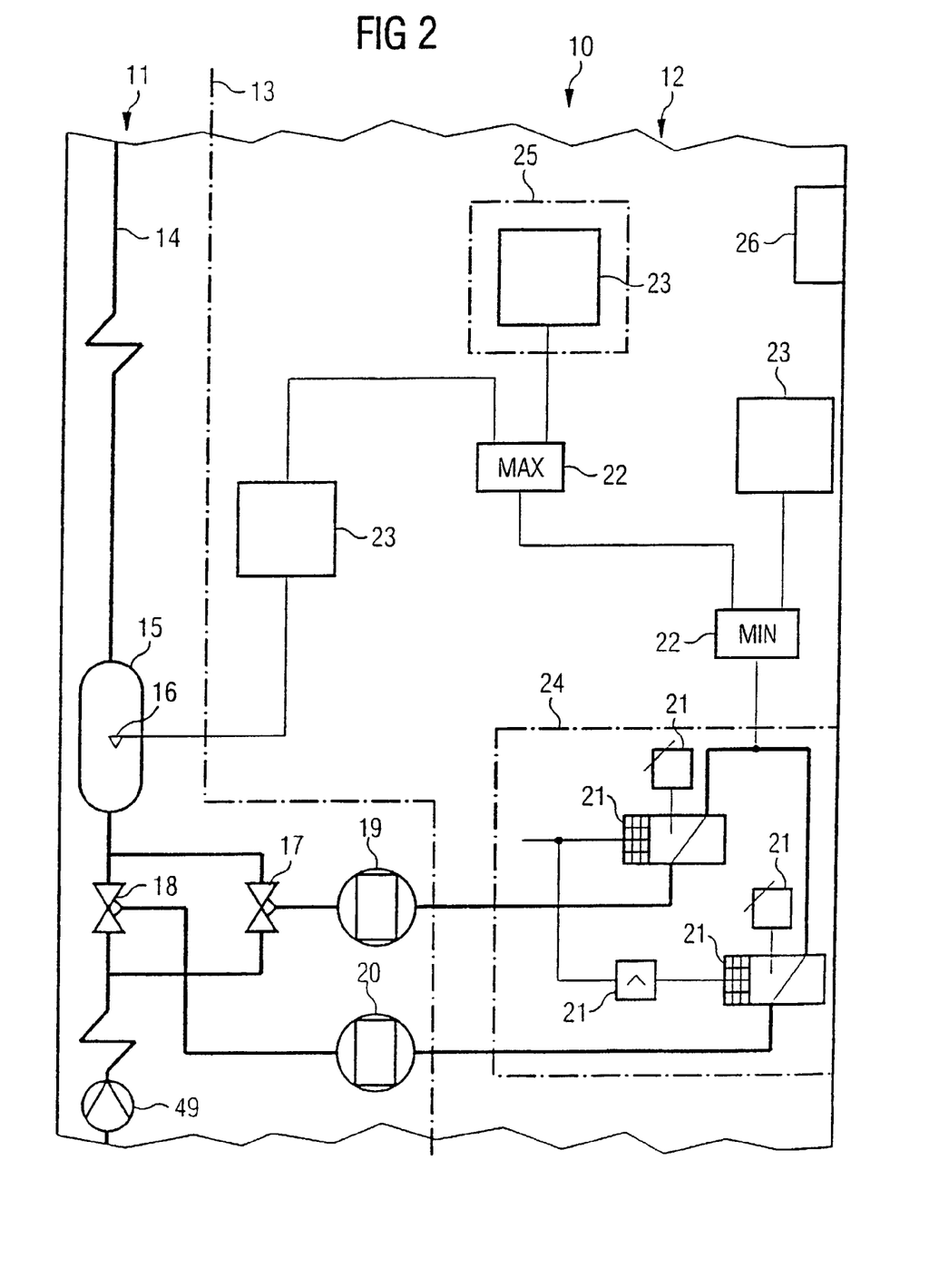
FIG. 2 shows a schematic illustration of a technology diagram.
Figure 3:
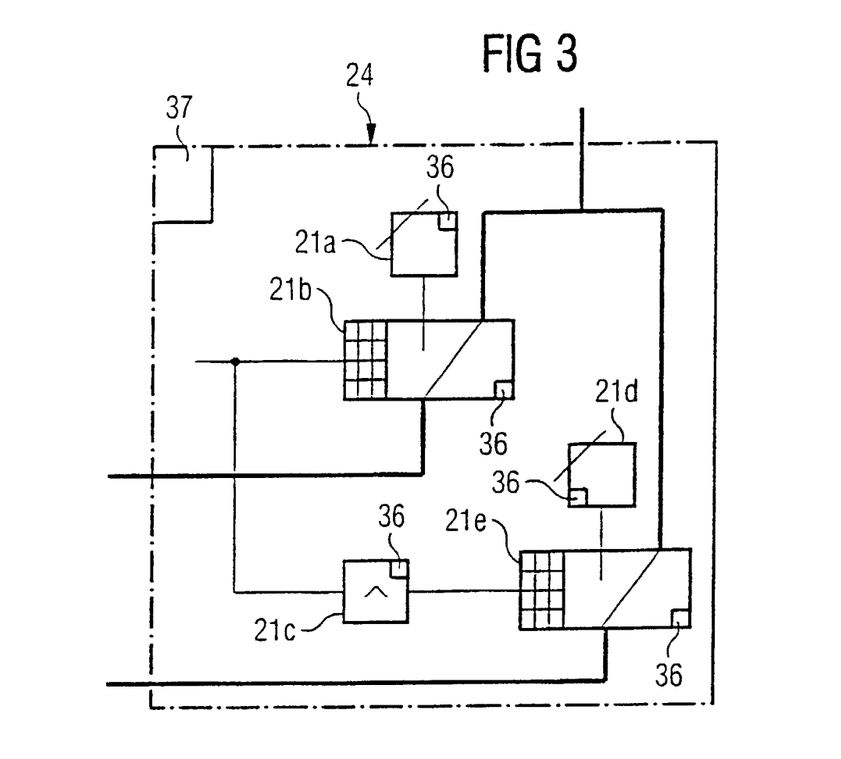
FIG. 3 shows an enlarged illustration of a section from the technology diagram shown in FIG. 2.
Figure 4:
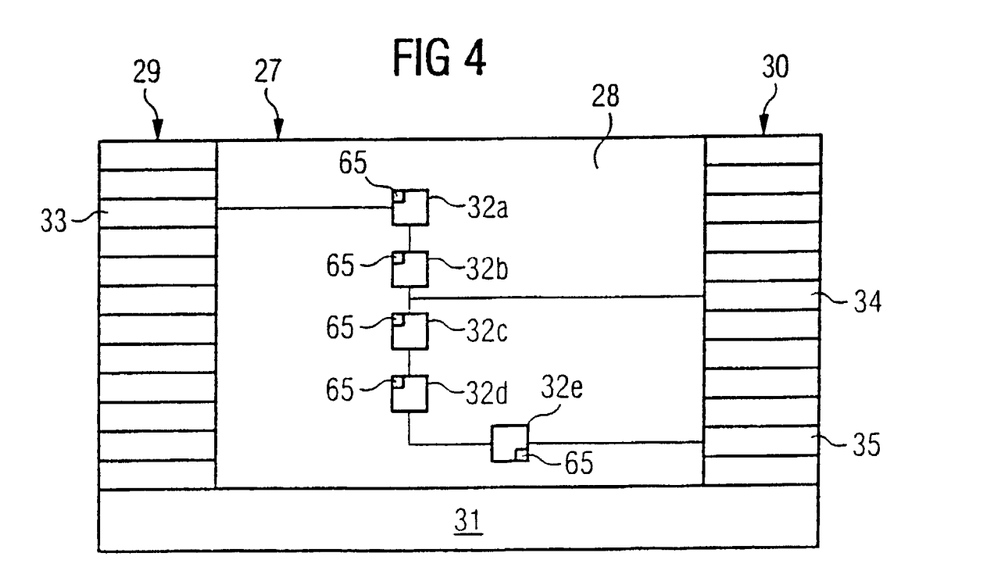
FIG. 4 shows an illustration of a function diagram.

FIGS. 2 to 4 schematically show a larger illustration of a further technology diagram 10, of a further section 24 and of the associated function diagram 27. The technology diagram 10 shown in FIG. 2 schematically describes a regulation function for the water level in the container 15. For this purpose, a level sensor 16 and two control valves 17, 18 with associated individual control elements for servomotors 19, 20 are provided. On the basis of the signal from the level sensor 16, the control valves 17, 18 and [lacuna] are operated by the servomotors 19, 20. Water is supplied via a pump 49.

The diagram 12 of the program code 52 shown in FIG. 2 contains not only the section 24 but also a series of comparators 22 and diagram symbols 23 and a unique identification 26. The diagram symbols 23 represent a graphically reduced representation of a plurality of symbols 21 and/or of a plurality of sections 24, 25. The information contained in these symbols 21 and sections 24, 25 is shown in no more detail in the technology diagram 10 shown in FIG. 2. This considerably facilitates clarity.

To show the information contained in the diagram symbol 23 in detail, the operator performs a suitable action. Particularly in the case of configuration directly on the screen, the detailed information can be shown by double clicking with the left-hand mouse button on the respective desired diagram symbol 23.

It is possible for a plurality of levels of such diagram symbols 23 to be connected above one another. In addition, a whole section 25 can be condensed to form a single diagram symbol 23.

To show the symbols 21, comparators 22 and diagram symbols 23, it is possible either to use existing graphical elements or to produce separate graphical elements and import them into the technology diagram 10.

The section 24 shown in FIG. 3 corresponds to the function diagram 27 shown in FIG. 4. For the purpose of clear association, both the section 24 and the function diagram 27 have been provided with an identification 37, 31. The symbols 21 in the section 24 and the modules 32 in the function diagram 27 also have a corresponding identification 36, 65.

The function diagram 27 comprises a link region 28 in which the individual modules 32 are shown and are connected to one another. It is also provided with a table 29 for input signals 33 and with a table 30 for output signals 34, 35. The identifications 31, 37 of the function diagram 27 and of the section 24 and the identifications 36, 65 of the symbols 21 and of the modules 32 provide a clear association between the technology diagram 10 and the function diagram 27. The input signals 33 and output signals 34, 35 are clearly stipulated by means of suitable break points.

The bounds of the sections 24, 25 in the actual technology diagram 10 stipulate which signals are exchanged between the function diagrams 27. The number of these signals can be recorded and subsequently used for a plausibility and consistency check between the technology diagram 10 and the function diagrams 27.

Figure 5:
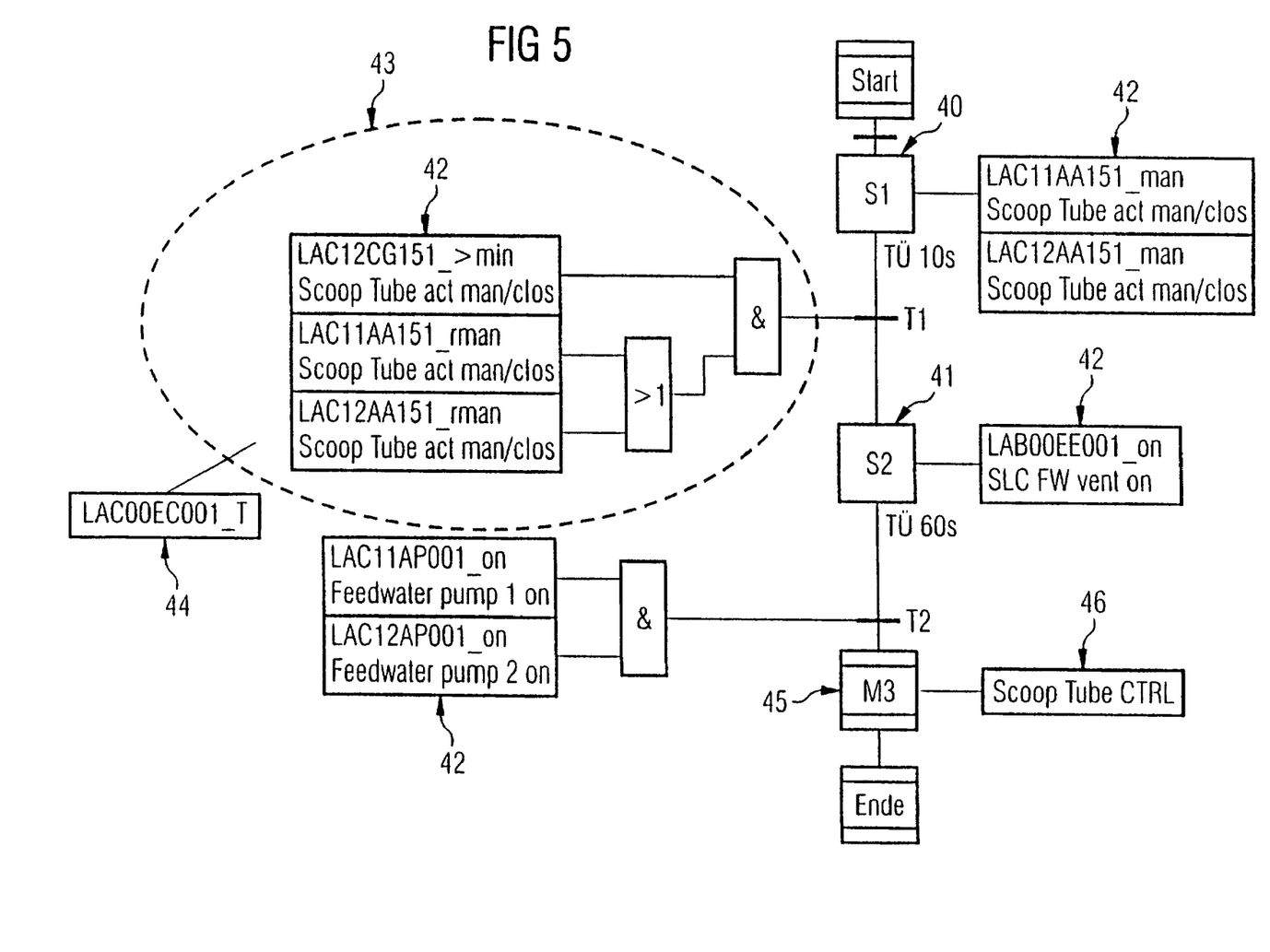
FIG. 5 shows the illustration of a step control function in the technology diagram.
Figure 6:
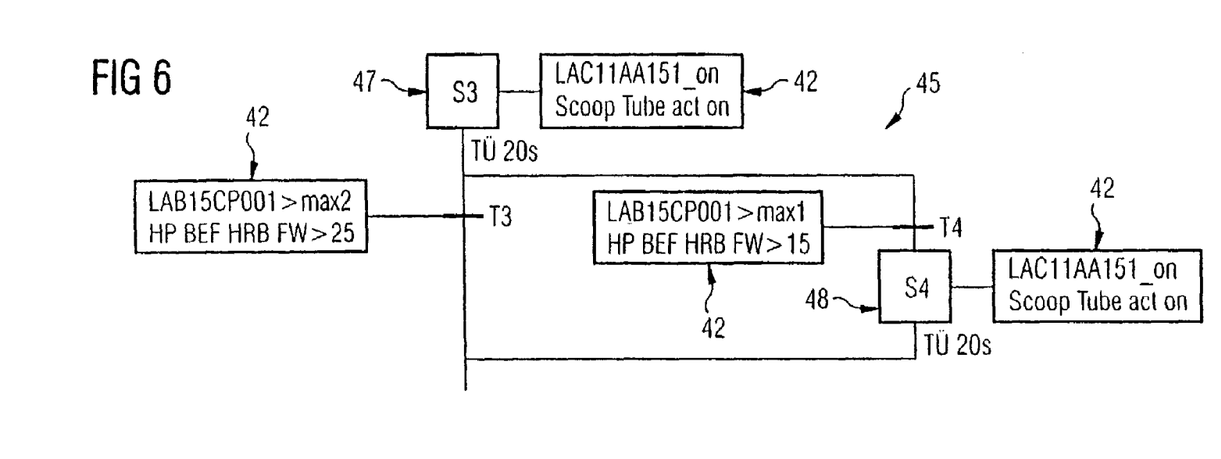
FIG. 6 shows an enlarged illustration of an individual step from FIG. 5.

FIGS. 5 and 6 schematically show the technology diagram for a step control function. The step control function comprises three steps 40, 41, 45 which are shown clearly. Any number of steps can be shown. For each step 40, references 42 with definitions of break points are shown. The transition $T_1$ denotes the passage between the steps 40 and 41. The transition condition comprises the link 43. This link can be assigned to a separate section 44. The link 43 is configured as a separate function diagram 27. Hence, a separate function diagram is produced for the defined diagram sections. The logic structure can thus be as complex as desired, and storing modules such as timers or flip-flops can also be used.

FIG. 6 gives an enlarged illustration of the macro-step 45. The macro-step 45 comprises two steps 47, 48, to each of which a corresponding reference 42 is assigned. In the case of configuration on the screen, the enlargement is called up by double clicking on step 45 in FIG. 5. Following completion of the configuration of the macro-step 45 in the technology diagram, the enlargement is closed again, so that the clear representation of FIG. 5 is produced.

In line with FIGS. 2 and 3, combinational logic functions such as partial and group control or measured-value corrections are also shown. This is possible as a result of the automatic generation of the function diagrams 27 from the technology diagram 10. The overall control task can thus be recorded continuously in the technology diagram 10.

Figure 7:
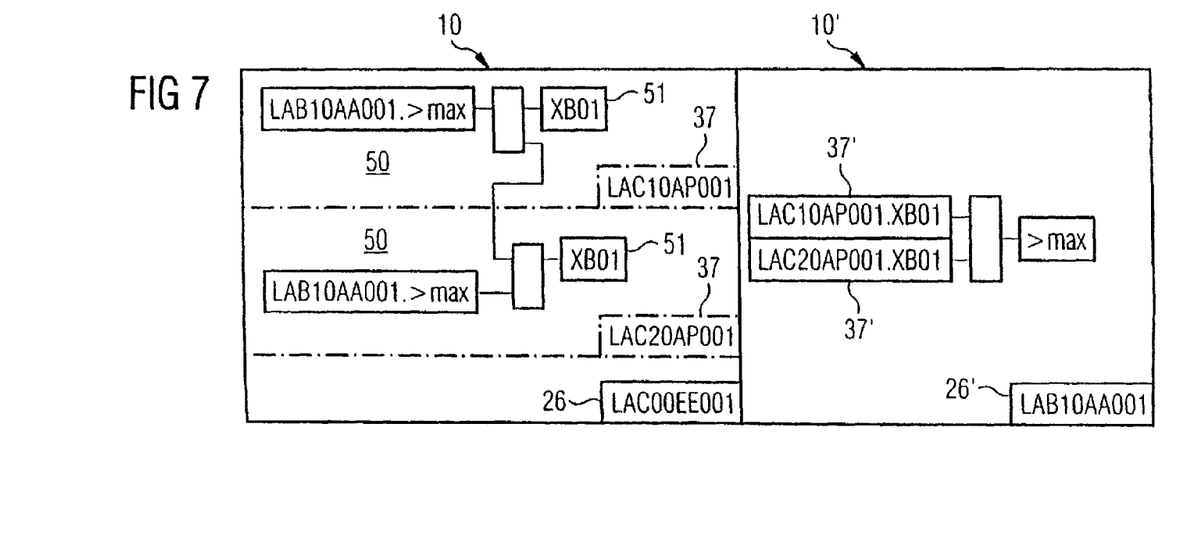
FIG. 7 shows a schematic illustration of the signal configuration.

The associated signal configuration is shown schematically in FIG. 7. The left-hand half shows a first technology diagram 10, and the right-hand half shows a second technology diagram 10'. The technology diagram 10 defines clear break points 51 for each diagram section 50. For the purpose of further characterization, an identification 26, 26' is also provided for each technology diagram 10, 10'. References to the defined signals are formed from the identification 37 for the diagram section 50 and from the signal name. In the technology diagram 10', the signals 51 which are formed in the technology diagram 10 and serve as break points are complemented and provided with a reference using the diagram name formed by means of 37'. The technology diagram 10' itself likewise has an identification 26'. A suitable action can be used to call the original technology diagram 10 from the technology diagram 10' and to alter it if appropriate.

Connections between individual symbols 21 in the technology diagram 10 which extend beyond the bounds of sections 24, 25 correspond to cross-diagram break points 50 in the function diagrams 27, such as also arise in the case of manual connection between two modules 32 in different function diagrams 27.

Naturally, a plurality of technology diagrams 10' can again be put together to form a further technology diagram 10''. This produces the diagram symbols 23, which allow a clear representation.

Figure 8:
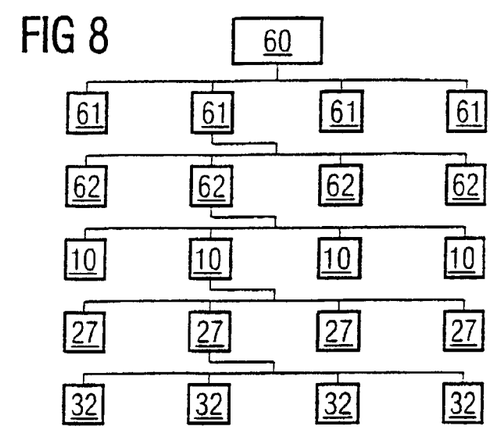
FIG. 8 shows the hierarchical structure of the instrumentation and control.

FIG. 8 schematically shows the hierarchical structure of the program code 52 for instrumentation and control which is used. Within an installation 60, any number of hierarchical levels can be defined. Each hierarchical node can be assigned one or more technology diagrams 10, whose sections 24, 25 respectively correspond to function diagrams 27 for the individual level. The function diagrams 27 in turn comprise one or more modules 32. The function diagrams 27 and their modules 32 can be clearly assigned to a particular section 24, 25 of a technology diagram 10 by means of their identification 31, 65. The section 24, 25 is clearly identified by means of the identification 37. This allows an association with the respective technology diagram 10, which is in turn characterized by means of the identification 26.

Figure 9:
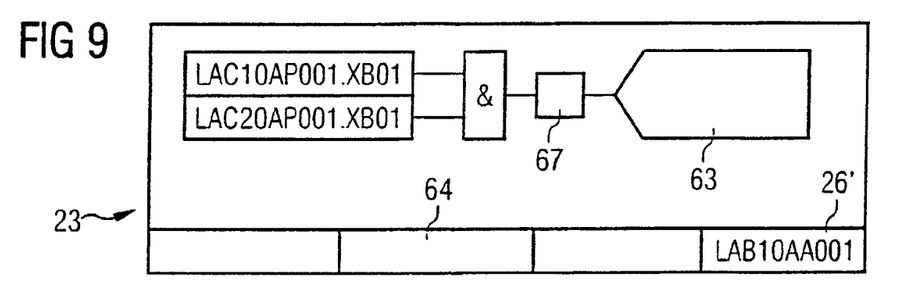
FIG. 9 shows an illustration of a report.

For the technology diagrams 10, an identification 26 is preferably used which extends over the whole installation 60. This allows clear links to be made between different technology diagrams 10 which are not associated with the same function identifier 62 or with the same automation system 61. These links can thus extend over the entire installation 60. FIG. 9 schematically shows a report. Linked reports are configured entirely in the technology diagram 10, since this is where the associated combinational logic is shown. The report itself is represented by a separate symbol 67 which is assigned precisely one report module when the function diagrams 27 are generated. On the basis of the measurement result or the logic combination, an output 63 is given whose individual report attributes can be configured directly for the technology diagram 10. In addition, configuration is provided in other fields. The associated diagram symbol 23 contains not only the identification 26' but also a name 64.

During the configuration of the reports, a distinction is made between different types. Reports filed on a standard basis, such as status reports and failure reports, are elements of the instrumentation and control system components. These reports are an element of the instrumentation and control 12 and cannot be manipulated in the technology diagram. Fault reports arising in this context need to be able to be provided separately from the rest of the fault reports and specifically. If failure reports relevant to factory management arise, the operator of the installation 60 needs to be notified of these, because he needs to react to restrictions of availability or to restrictions of load capability. The corresponding reports are configured in the technology diagram 10. This also applies to reports which concern failures of control and regulation functions. The individual reports are requests to the operator to perform particular actions. The respective actions to be performed are generally indicated in the operating manual. Each report is therefore advantageously assigned a break point relating to the operating manual in order to allow fast access.

Figure 10:
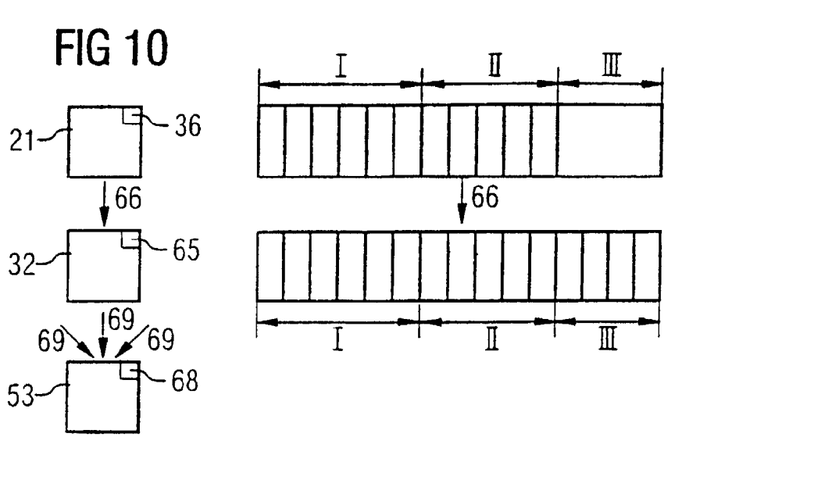
FIG. 10 shows a schematic illustration of the transfer of information between technology diagram and Sub-diagram.

FIG. 10 schematically shows the transfer of information between a technology diagram 10 and a function diagram 27. Each symbol 21 in the technology diagram 10 has various associated information, shown schematically by the sub-regions I, II. The information from the sub-region I is shown in a technology diagram 10, while the information from the sub-region II is suppressed. This increases clarity. The sub-region III is used for holding information which is not contained in the technology diagram 10. This information relates to details of the instrumentation and control which are not relevant to the basic concept and are in may cases not yet known or have not been definitively stipulated when producing the technology diagram 10. However, it is possible to determine clearly which information is still required for generating the associated function diagram 27, so that memory space and break points 50 can be provided accordingly.

With the assignment of the symbol 21 to the module 32 of the respective function diagram 27 by means of the identification 36, 65 as shown by arrow 66, the information is automatically transferred from the sub-region I, II to the function diagram 27. At the same time, an indication is given that information needs to be added to the sub-region III. This is done manually directly in the function diagram 27 or in the technology diagram 10 immediately before the generation. Following the addition of this information, the assigned individual sequence 53 is automatically generated. For the purpose of assignment, each individual sequence 53 is provided with an identification 68. To generate the individual sequence 53, use is made of a plurality of modules 32, as is shown schematically by arrows 69.

Figure 11:
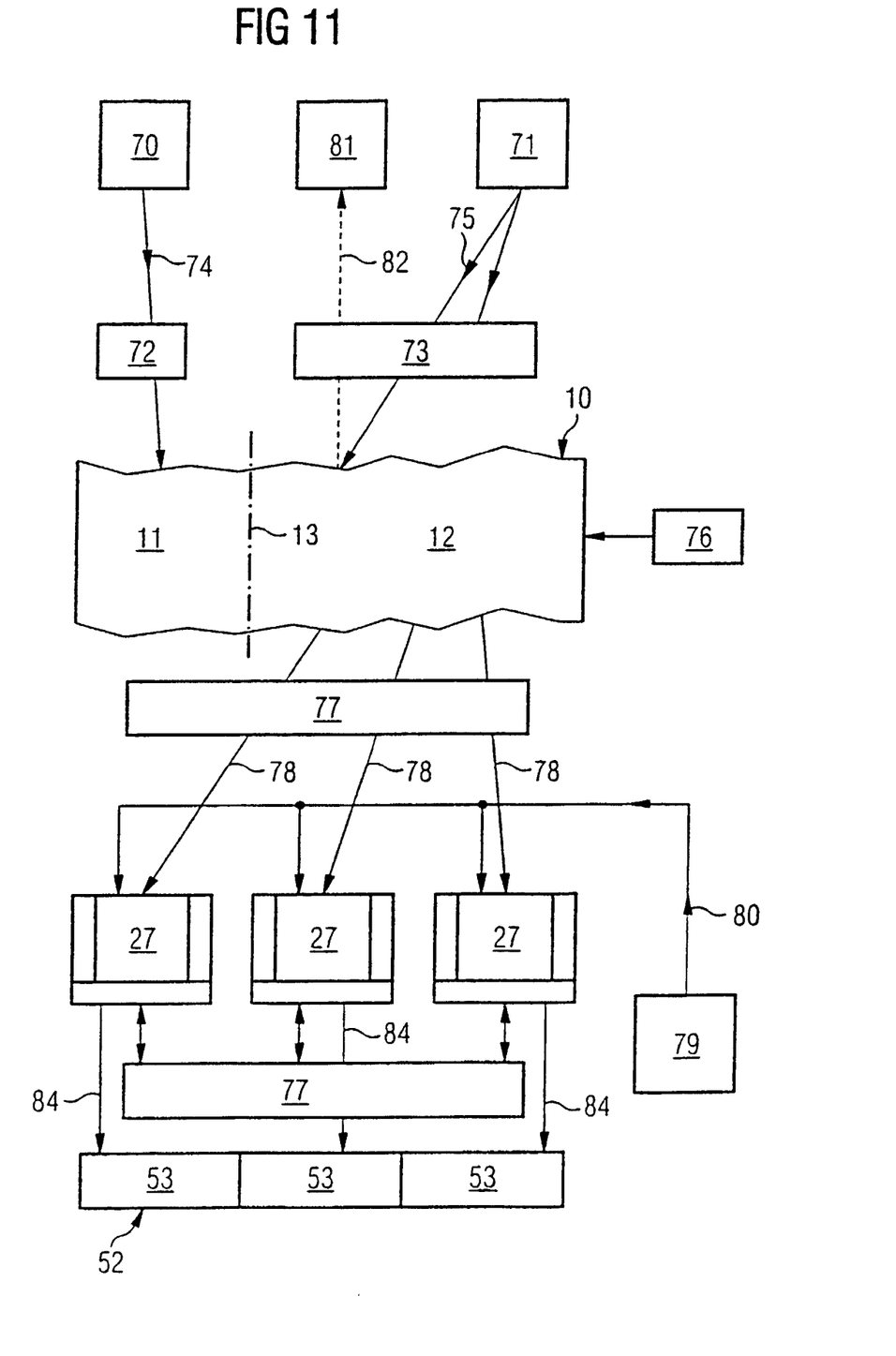
FIG. 11 shows a schematic illustration of a second embodiment of the inventive method.

FIG. 11 schematically shows another embodiment of the inventive method. The technology diagram 10 has two interfaces 72, 73 for importing information from other engineering systems 70, 71, as shown by arrow 74, 75. The process engineering and the instrumentation and control are configured in these engineering systems 70, 71 in advance and are then put together in the technology diagram 10. Engineering systems 70, 71 which are known in this context can be used. Naturally, information can also be exported from the technology diagram 10 into one or more engineering systems, as indicated by the arrow 82.

When the information has been imported, the technology diagram 10 is subjected to a plausibility check 76. This plausibility check 6 is advantageously also performed after changes to the technology diagram 10. When configuration is complete, the function diagrams 27 are automatically generated, as shown by the arrows 78. During generation, a consistency check 77 is performed, for example using the defined break points 50 and the respective identifications used. This consistency check 77 is also performed between the individual function diagrams 27.

If the technology diagram has gaps as per the sub-region III from FIG. 10, these gaps are input manually using an interface 79, as shown by arrow 80. Alternatively, the information required for generating the function diagrams 27 completely can be retrieved from a library.

Once the function diagrams 27 have been completed, the respectively assigned individual sequences 53 are automatically produced and put together in the program code 52 for instrumentation and control.

An embodiment of the inventive method makes it possible to show process-engineering diagrams 11 and diagrams 12 for instrumentation and control in a joint technology diagram 10. The technology diagram 10 can be matched to changes made in other engineering systems 70, 71 quickly, easily and without errors by importing information. The cooperation between the process engineering operatives and the control operatives is facilitated considerably, however. According to an embodiment of the invention, once the technology diagram 10 has been produced, the required function diagrams 27 for the individual level are generated automatically. Manual implementation and manual configuration of change are no longer necessary, which means that errors arising to date when producing the function diagrams 27 are completely precluded. Detailed information which is not required for the cooperation between the process-engineering operatives and the control operatives can be added to the technology diagram and/or to the automatically generated function diagrams 27 at a later time.

Besides the pure information for the diagrams 11, 12, other graphical symbols can be imported from the engineering systems 70, 71 or can be produced independently. This allows individual matching to the respective operatives, which again improves clarity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for automatically producing program code for instrumentation and control, for operating an installation with process-engineering components, where a machine-readable technology diagram for the installation is provided which contains both a graphical diagram of the process engineering and a further graphical diagram of the program code, the graphical diagram of the process engineering and the further graphical diagram of the program code being shown together in the machine readable technology diagram, and the further diagram being divided into a number of sections which each including one or more interlinked symbols which schematically represents the program code to be produced, comprising:
  a) automatically assigning each symbol in a section a functional module, wherein links between symbols are automatically used to stipulate links between functional modules so that a function diagram for the section of the further diagram is formable from the functional modules and respective links;
  b) automatically producing, using each function diagram, a respective individual sequence of the program code for each section; and
  c) automatically producing the program code from the produced individual sequences.

2. The method as claimed in claim 1, wherein producing the function diagrams involves a check being carried out to determine whether the information required for producing the function diagrams is contained in the technology diagram.

3. The method as claimed in claim 2, wherein precisely one function diagram is produced from precisely one section.

4. The method as claimed in claim 3, wherein each section includes a series of symbols, and each of these symbols is assigned to precisely one module of the associated function diagram.

5. The method as claimed in claim 1, wherein precisely one individual sequence is generated from each function diagram.

6. The method as claimed in claim 2, wherein, to improve clarity, at least one of a plurality of symbols and a plurality of sections of the technology diagram are combined and put together to form a diagram symbol.

7. The method as claimed in claim 1, wherein symbols contained in the technology diagram are provided with an identification.

8. The method as claimed in claim 1, wherein the technology diagram is subjected to a validity check.

9. The method as claimed in claim 1, wherein a consistency check is carried out between the individual function diagrams and between the function diagrams and the technology diagram.

10. The method as claimed in claim 1, wherein the technology diagram is provided with at least one interface for connecting it to other engineering systems.

11. The method as claimed in claim 10, wherein information is imported into the technology diagram from other engineering systems.

12. The method as claimed in claim 10, wherein information is exported from the technology diagram to other engineering systems.

13. The method as claimed in claim 1, wherein information contained in the technology diagram is shown graphically.

14. The method as claimed in claim 13, wherein, to show the information, graphical symbols are imported into the technology diagram.

15. The method as claimed in claim 13, wherein a portion of the information contained in the technology diagram is shown graphically.

16. The method as claimed in claim 1, wherein a portion of the information required for fully generating the function diagrams and individual sequences is included in the technology diagram.

17. The method as claimed in claim 16, wherein generation of the function diagrams involves the identification and display of gaps in the information contained in the technology diagram.

18. The method as claimed in claim 11, wherein information is exported from the technology diagram to other engineering systems.

19. The method as claimed in claim 14, wherein a portion of the information contained in the technology diagram is shown graphically.

20. The method as claimed in claim 1, wherein each function diagram corresponds to at least one software module.

21. The method of claim 1, wherein each function diagram corresponds to a process engineering function.

22. A method for automatically producing program code for use in an installation with process-engineering components, comprising:
  providing a machine-readable technology diagram for the installation, the diagram being divided into a number of sections, each including one or more symbols;
  assigning each symbol in a section a functional module, wherein links between symbols stipulate links between functional modules, and wherein a functional diagram is automatically generateable for each section from corresponding symbols and links; and
  assigning program code to functional modules, wherein a respective individual sequence of the program code is automatically generateable from a functional diagram and wherein the program code is automatically produceable from the individual sequences; wherein
  the machine-readable technology diagram shows a graphical diagram of the process-engineering components and a graphical diagram of the program code concurrently.

23. The method as claimed in claim 22, wherein precisely one function diagram is produced from precisely one section.

24. The method as claimed in claim 23, wherein each section includes a series of symbols, and each of these symbols is assigned to precisely one module of the associated function diagram.

25. The method as claimed in claim 22, wherein precisely one individual sequence is generated from each function diagram.

26. The method as claimed in claim 22, wherein information is imported into the technology diagram from other engineering systems.

27. The method as claimed in claim 22, wherein information is exported from the technology diagram to other engineering systems.

28. The method as claimed in claim 22, wherein information contained in the technology diagram is shown graphically.

29. The method as claimed in claim 28, wherein, to show the information, graphical symbols are imported into the technology diagram.

* * * * *